United States Patent [19]

Noguchi et al.

[11] Patent Number: 5,658,376
[45] Date of Patent: Aug. 19, 1997

[54] WATER-BASED DISPERSION INK FOR BUBBLE JET PRINTING AND INK-JET RECORDING METHOD AND APPARATUS USING SAME

[75] Inventors: Hiromichi Noguchi, Hachioji; Masahiro Haruta, Tokyo; Shoji Koike, Yokohama; Koromo Shirota, Kawasaki; Aya Yoshihira, Yokohama; Tomoya Yamamoto; Mariko Suzuki, both of Kawasaki, all of Japan

[73] Assignee: Canon Kabushiki Kaisha, Tokyo, Japan

[21] Appl. No.: 558,481

[22] Filed: Nov. 16, 1995

[30] Foreign Application Priority Data

Nov. 17, 1994 [JP] Japan .................. 6-307136
Sep. 29, 1995 [JP] Japan .................. 7-275157

[51] Int. Cl.⁶ .................. C09D 11/02; C09D 11/14
[52] U.S. Cl. .................. 106/31.43; 106/31.59; 347/100
[58] Field of Search .................. 106/20 R, 25 R, 106/26 R

[56] References Cited

U.S. PATENT DOCUMENTS

| | | | |
|---|---|---|---|
| 4,270,917 | 6/1981 | Heald et al. | 8/527 |
| 4,849,770 | 7/1989 | Koike et al. | 346/1.1 |
| 4,853,036 | 8/1989 | Koike et al. | 106/20 |
| 4,957,533 | 9/1990 | Koike et al. | 106/20 |
| 5,075,699 | 12/1991 | Koike et al. | 346/1.1 |
| 5,106,417 | 4/1992 | Hauser et al. | 106/20 D |
| 5,124,718 | 6/1992 | Koike et al. | 346/1.1 |
| 5,141,556 | 8/1992 | Matrick | 106/20 D |
| 5,151,128 | 9/1992 | Fukushima et al. | 106/20 |
| 5,160,370 | 11/1992 | Suga et al. | 106/19 R |
| 5,250,121 | 10/1993 | Yamamoto et al. | 106/22 R |
| 5,329,305 | 7/1994 | Fukushima et al. | 347/95 |
| 5,358,558 | 10/1994 | Yamamoto et al. | 106/22 R |
| 5,382,283 | 1/1995 | Yui et al. | 108/22 B |
| 5,439,514 | 8/1995 | Kashiwazaki et al. | 106/20 C |
| 5,441,561 | 8/1995 | Chujo et al. | 106/22 B |

FOREIGN PATENT DOCUMENTS

| | | | |
|---|---|---|---|
| 55-54353 | 4/1980 | Japan | C09B 67/40 |
| 62-116678 | 5/1987 | Japan | C09D 11/16 |
| 1-301760 | 12/1989 | Japan | C09C 3/10 |
| 2-255875 | 10/1990 | Japan | C09D 11/00 |
| 4-18467 | 1/1992 | Japan | C09D 11/00 |
| 4-334870 | 11/1992 | Japan | H01M 8/04 |

*Primary Examiner*—Helene Klemanski
*Attorney, Agent, or Firm*—Fitzpatrick, Cella, Harper & Scinto

[57] ABSTRACT

The invention provides a water-based dispersion ink for bubble jet system which contains at least water, a water-soluble organic solvent, a disperse dye or pigment, a surfactant, and/or an alkali-soluble, water-soluble polymer having a carboxylic acid value, wherein the surfactant is a polyoxyethylene alkyl ether or a polyoxyethylene alkylphenyl ether having an anionic group, selected from phosphoric acid and carboxylic acid, at the ethylene oxide terminal and also having HLB equal to or more than 10.

15 Claims, 3 Drawing Sheets

WATER-BASED DISPERSION INK FOR BUBBLE JET PRINTING AND INK-JET RECORDING METHOD AND APPARATUS USING SAME

BACKGROUND OF THE INVENTION

1. Field of the Invention

The present invention relates to a water-based dispersion ink for a bubble jet recording system using disperse dyes or pigments, and an ink-jet recording method and an apparatus using the ink. More particularly, the present invention relates to a water-based dispersion ink which has a superior dispersion stability in a fine particle, state of disperse dyes or pigments with an average particle size ranging from 0.08 to 1 µm and also has superior ejection properties in, especially, ink-jet recording apparatus based on the bubble jet printing, as well as an ink-jet recording method and an apparatus using the ink.

2. Related Background Art

Recently, water-based pigment dispersions have been used as an ink for writing implements and ink-jet recording apparatus. However, in a system designed to make recording based on the principles that a large amount of heat is directly applied to an ink in a moment to boil the ink itself for forming droplets and also providing ejection energy, such as a bubble jet printing system, it is very difficult to practice printing by employing, as an ink, conventional dispersions as they are. The reason is that, since an ink itself is bubbled on a heating element (heater) of a recording head, the dispersion is thermally destroyed and aggregated to precipitate deposits on the heater, which remarkably reduce the efficiency of bubbling of the ink in subsequent steps.

Therefore, any of means to suppress aggregation of the dispersion, or materials or devices enabling ink ejection to be continued has been required even when the dispersions will be aggregated. In particular, for disperse dyes or organic pigments, it has been difficult to obtain fine particles with the mean particle size of 0.2 µm or less in techniques per se, and limitations have been encountered in a particle size attainable from an industrial point of view. Accordingly, there has been demanded for development of a dispersion technique that can efficiently disperse fine particles having the mean particle size in the range of from 0.08 to 1 µm, and can provide a dispersion having a high stability for preservation and being adaptable for an ejection stability in bubble jet recording apparatus, i.e., being able to respond to a driving frequency at a range of from 3 kHz to 8 kHz.

As the prior art in relation to the present invention, applications of dispersions of water-based pigments to an ink-jet recording ink are disclosed in Japanese Patent Application Laid-Open No. 62-116678, No. 2-255875, No. 1-301760, No. 4-334870, and No. 4-18467. In these disclosed inventions, however, no descriptions are found on not only the problems of fine particle dispersion of organic pigments and ejection properties of the organic pigments in the bubble jet system, but also means for solving the problems. Further, with regard to fine particle dispersion of disperse dyes for use in the bubble jet system, techniques capable of meeting the above-mentioned requirements, i.e.. stability of dispersion for a long term and ejection-continuing properties necessary for the bubble jet system, and applications of the techniques are not almost known.

Meanwhile, with regard to a water-based dispersion of disperse dyes, Japanese Patent Application Laid-Open No. 55-54353 can be cited as disclosing the prior art in relation to the present invention. This invention is featured in that phosphated alkylphenolethoxylate in an amount of from 1 to 100% by weight is contained for a weight of dye. As per the laid-opened publication, a crystal growth of a dye molecule in a dispersing medium can be suppressed. With the technique of the disclosed invention, however, it is impossible to obtain a dispersion of fine particles having an average particle size in the range of from 0.08 to 1 µm for use as an ink for an ink-jet recording system and, especially, to achieve satisfactory ejection properties in the bubble jet system.

SUMMARY OF THE INVENTION

The present invention has been made in view of the prior arts as set forth above, and its object is to provide a water-based dispersion ink for bubble jet printing using disperse dyes or pigments, which has a superior dispersion stability in a fine particle state with an average particle size ranging from 0.08 to 1 µm and also has superior ejection properties in, especially, an ink-jet recording apparatus in a bubble jet system.

Another object of the present invention is to design a water-based dispersion ink mainly applied to recording on paper, and to provide a water-based dispersion ink which can offer recorded images having a high color quality and superior fastnesses for sheets of recording paper exhibiting an absorption to a water-based ink, i.e., sheets of the so-called plain paper such as woodfree paper, copying paper, letter paper, heat transfer paper, and business form paper for wire dot printers, and the like, as well as recording media exhibiting an absorption to a water-based ink, e.g., paper for an ink-jet system, films, undercoated metals and plastics.

Still another object of the present invention is to provide a water-based dispersion ink for bubble jet system using a disperse dye-based ink for polyester printing, which has succeeded in submicron dispersion to ensure a superior dispersion stability and also has superior ejection properties in, especially, ink-jet recording apparatus used in a bubble jet system.

Still another object of the present invention is to provide an ink-jet recording method, equipment and apparatus using the above water-based dispersion ink for bubble jet system.

The above objects can be achieved by the present invention.

According to the present invention, there is provided a water-based dispersion ink for a bubble jet system which comprises water, a water-soluble organic solvent, a disperse dye or pigment, a surfactant, and/or an alkali-soluble and water-soluble polymer having a carboxylic acid value, wherein the surfactant is a polyoxyethylene alkyl ether or a polyoxyethylene alkylphenyl ether having an anionic group selected from the group consisting of a phosphoric acid and carboxylic acid group, at the ethylene oxide terminal, and also having an HLB equal to or more than 10.

According to the present invention, there is also provided an ink-jet recording method by which droplets of ink formed by an ink-jet process are deposited on a recording medium to perform recording, wherein the foregoing water-based dispersion ink for bubble jet system is employed as the ink.

According to the present invention, there is further provided an ink-jet recording method wherein the foregoing water-based dispersion ink for a bubble jet system is ejected from a recording head which utilizes film boiling of a thin film heater as a source for generating ejection energy to perform recording.

According to the present invention, there is also further provided an ink cartridge which has an ink storage portion containing an ink, wherein the foregoing water-based dispersion ink for bubble jet system is employed as the ink.

According to the present invention, there is still provided a recording unit comprising an ink storage portion containing an ink and a head portion for ejecting the ink in the form of ink droplets, wherein the foregoing water-based dispersion ink for bubble jet system is employed as the ink.

According to the present invention, there is still also provided an ink-jet recording apparatus by which droplets of ink formed by an ink-jet process are deposited on a recording medium to perform recording, wherein the apparatus includes the foregoing ink cartridge or recording unit.

DETAILED DESCRIPTION OF THE PREFERRED EMBODIMENTS

Figure 1:
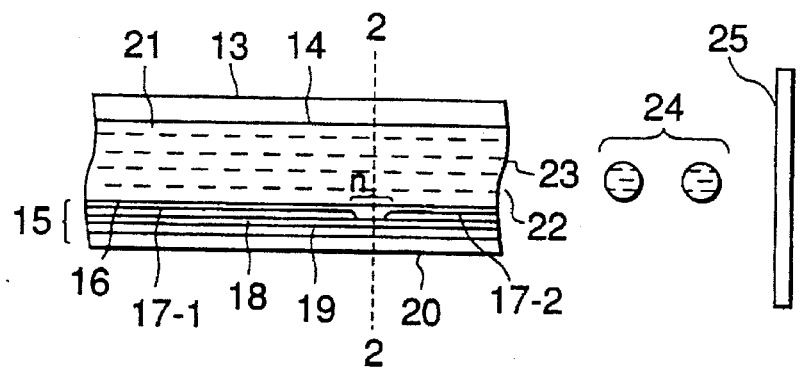
FIG. 1 is a longitudinal cross-sectional view of a head portion of an ink-jet recording apparatus.

A water-based dispersion ink for bubble jet system (hereinafter referred to as "a water-based dispersion ink") of the present invention comprises water, a water-soluble organic solvent, a disperse dye or pigment, a surfactant, and/or an alkali-soluble and water-soluble polymer having a carboxylic acid value, wherein the surfactant is a polyoxyethylene alkyl ether or a polyoxyethylene alkylphenyl ether having an anionic group selected from the group consisting of a phosphoric acid group and a carboxylic acid group, at the ethylene oxide terminal and also having an HLB (Hydrophilic-Lypophilic Balance) equal to or more than 10.

With the present invention, since the anionic group of the surfactant is neutralized by alcohol amines, it is possible to more surely prevent clogging in ink-jet recording apparatus and to further improve ejection properties in the bubble jet system.

Preferably, the water-based dispersion ink contains an alkali-soluble addition polymer having a carboxylic acid value which is used as a dispersant or added to a dispersion dispersed with a surfactant. In any case, the use of such a water-soluble polymer contributes to a further improvement in preservation stability of the ink. This means that either the surfactant or the alkali-soluble addition polymer may be employed as a dispersant, but the combined use of them is very effective.

It is here to be noticed that any one of the alkali-soluble addition polymer having a carboxylic acid value and the surfactant is employed as a dispersant, rather than using both of them as a dispersant in a combined manner.

The alkali-soluble addition polymer having a carboxylic acid value and the surfactant have their roles below.

(1) When pigments or dyes are dispersed by using, as a dispersant, an alkali-soluble addition polymer having a carboxylic acid value and a surfactant is then added, the surfactant contributes to an improvement in ejection efficiency of the dispersion, which is prepared by using the alkali-soluble addition polymer, in the bubble jet system.

(2) A dispersion prepared by dispersing pigments or dyes with the above-defined surfactant used as a dispersant has no significant problems related to the ejection efficiency in the bubble jet system, but its preservation stability for a long term may be insufficient in some cases. An improvement in the preservation stability can be achieved by adding the alkali-soluble addition polymer.

Thus, the above two materials have roles to compensate for deficiencies in their capabilities each other when they are both employed in a proper manner.

Surfactant

The surfactant for use in the present invention is a polyoxyethylene alkyl ether or a polyoxyethylene alkylphenyl ether having an anionic group selected from the group consisting of a phosphoric acid and a carboxylic acid, at the ethylene oxide terminal, and also having HLB equal to or more than 10. These compounds are known as belonging to a group of surfactants which possess both nonionic and anionic natures. Compounds that can effectively be used in the present invention are required to have an HLB, i.e., an index value representative of balance between hydrophilicity and lipophilicity, equal to or more than 10. If the HLB is less than 10, fine particle dispersibility in the water-based medium, initial ejection properties, and continuance of ejection properties for a long term cannot all be achieved. The HLB is effective so long as not less than 10, but it is preferably held in the range of from 10 to 16.

Compounds available as the surfactant in the present invention include those ones represented by general formulae (I), (II) and (III):

   (I)

wherein $R_1$ is

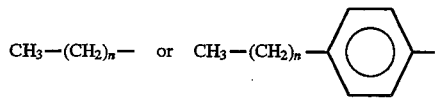

where n is an integer of form 6 to 24, $R_2$ is $—O—(CH_2CH_2O)_m—$ where m is an integer of from 8 to 48, X is

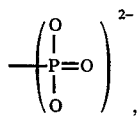

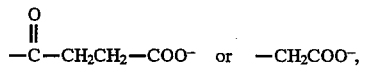

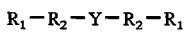   (II)

wherein

Y is

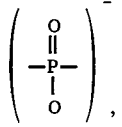

and $$R_1-R_2-Z-R_2-R_1 \quad (III)$$
$$\qquad\quad |$$
$$\qquad\quad R_2$$
$$\qquad\quad |$$
$$\qquad\quad R_1$$

wherein

Z is $$\left(\begin{array}{c} O \\ \| \\ -P- \\ | \end{array}\right).$$

The number of carbons of the long-chain alkyl radical in $R_1$ as the hydrophobic atomic group is preferably equal to or more than 7, and may contain an aromatic group. Because of having an anionic group, the surfactant given by any of the above-defined compounds is a material featured in having a relatively high surface tension (45 mN/m or more at 0.1% to 0.5%) in its aqueous solution and also exhibiting a high solubility in water.

The reasons why the materials expressed by the above general formulae can provide a high dispersibility and improve ejection properties are not clear, but it is apparent that the foregoing features lead to a good emulsification and a high dispersibility of disperse dyes or pigments for use in the ink-jet recording. It is also presumed that the foregoing features develop a remarkable action to easily eliminate adverse results of destruction of the dispersion thermally occurred on a heater, i.e., aggregation and deposition of fine particles, from a heater surface, and hence are effective in not only increasing the utility factor of heat to produce bubbles, but also minimizing the destruction of the dispersion and the aggregation of the fine particles. Additionally, chemical reasons why the above-defined materials have a far marked effect as compared with other surfactants are not clear.

Structural formulae of examples of the surfactant usable in the present invention are listed below.

Phosphoric Acid Type Surfactants $$CH_3-(CH_2)_7-O-(CH_2CH_2O)_{12}-PO_3H, \qquad (1)$$

$$CH_3-(CH_2)_7-\bigcirc-O-(CH_2CH_2O)_{16}-PO_3H, \qquad (2)$$

$$CH_3-(CH_2)_7-\bigcirc-O-(CH_2CH_2O)_{14}-PO_3H, \qquad (3)$$

$$\qquad\qquad\qquad\qquad\qquad\qquad O \qquad\qquad\qquad\qquad (4)$$
$$\qquad\qquad\qquad\qquad\qquad\qquad \|$$
$$HO\text{-}CH_2CH_2NH_3{}^+\text{-}O-P-(CH_2CH_2O)_{10}-(CH_2)_8-CH_3,$$
$$\qquad\qquad\qquad\qquad\qquad\quad |$$
$$\qquad\qquad\qquad\qquad\qquad\quad (CH_2CH_2O)_{10}-(CH_2)_8-CH_3$$

$$\qquad O \qquad\qquad\qquad\qquad\qquad\qquad\qquad\qquad\qquad (5)$$
$$\qquad \|$$
$$HO-P-(CH_2CH_2O)_{12}-\bigcirc-(CH_2)_7-CH_3,$$
$$\quad\;\; |$$
$$\qquad (CH_2CH_2O)_{12}-\bigcirc-(CH_2)_7-CH_3$$

and $$\qquad\quad (CH_2CH_2O)_{10}-(CH_2)_5-CH_3 \qquad (6)$$
$$\qquad\;\;/$$
$$O=P-(CH_2CH_2O)_{10}-(CH_2)_5-CH_3.$$
$$\qquad\;\;\backslash$$
$$\qquad\quad (CH_2CH_2O)_{10}-(CH_2)_5-CH_3$$

Carboxylic Acid Type Surfactants

| | |
|---|---|
| $CH_3(CH_2)_8O(CH_2CH_2O)_3CH_2COOH$ | HLB = 10.2, (7) |
| $CH_3(CH_2)_8O(CH_2CH_2O)_6CH_2COOH$ | HLB = 13.5, (8) |
| $CH_3(CH_2)_8O(CH_2CH_2O)_9CH_2COOH$ | HLB = 15.1, (9) |
| $CH_3(CH_2)_{10}O(CH_2CH_2O)_9CH_2COOH$ | HLB = 14.2, (10) |
| $CH_3(CH_2)_{10}O(CH_2CH_2O)_{12}CH_2COOH$ | HLB = 15.3, (11) |
| $CH_3(CH_2)_{12}O(CH_2CH_2O)_{10}CH_2COOH$ | HLB = 14.1, (12) |

$$CH_3-(CH_2)_8-CH-O-(CH_2CH_2O)_{12}CH_2COOH \quad HLB = 15.1, \qquad (13)$$
$$\qquad\qquad\qquad\;\;/$$
$$\qquad\qquad\qquad C_2H_5$$

and $$CH_3 \qquad\qquad\qquad\qquad\qquad\qquad\qquad\qquad\qquad\qquad\qquad (14)$$
$$\quad\backslash$$
$$\quad\;\;CH-(CH_2)_8-O-(CH_2CH_2O)_{12}-CH_2COOH \quad HLB = 15.4.$$
$$\;\;/$$
$$CH_3$$

The above-listed structural formulae represent a part of the examples. Commercially available compounds usable as the surfactant include, by way of example: polyoxyethylene alkyl ether phosphoric acid DLP-10 (HLB 17.0), TLP-4 (HLB 13.0), DOP-8N (HLB 12.5), DDP-8 (HLB 11.5), DDP-10 (HLB 13.5), TDP-8 (HLB 11.5) and TDP-10 (HLB 14.0) (all trade name, available from Nikko Chemicals Co., Ltd.); Phosphanol RE-510 (HLB 10.5), Phosphanol RE-610 (HLB 12.6), Phosphanol RE-960 (HLB 11.2), Phosphanol RS-610 (HLB 10.5), Phosphanol RS-710 (HLB 13.3), Phosphanol ML-220 (HLB 12.5), Phosphanol LO-529 (HLB 13.6) and Phosphanol RD-720 (HLB 14.4) (all trade name, available form Toho Kagaku K.K.); and ammonium salts and alkanolamine salts thereof.

When the surfactant exemplified above is used for dispersing dyes or pigments, a weight ratio of a disperse dye to a surfactant or an organic pigment to a surfactant is set to fall in the range of approximately from 100:10 to 100:300. The optimum weight ratio is experimentally determined depending on individual materials so that the viscosity and the mean particle size of a resulting dispersion are minimized. When the surfactant is added to the dispersion dispersed with an alkali-soluble addition polymer for the purpose of raising the level of ejection properties and a preservation stability, the amount of the surfactant added is selected to fall in the range of 0.1 to 3% by weight, preferably 0.3 to 1.0% by weight, with respect to a total weight of the ink. The optimum amount of the surfactant in practical individual mixtures is experimentally determined as with the above case.

Water-Soluble Polymer

The water-soluble polymer for use in the water-based dispersion ink of the present invention is water-soluble polymer having no dissociation group or an alkali-soluble addition polymer having either a carboxylic acid or a sulfonic acid. When the disperse dyes or the organic pigments are dispersed by using the surfactant as a dispersant, the water-soluble polymer is added to the dispersion to improve a preservation stability of the dispersion. In particular, a preservation stability of the disperse dye-based dispersion dispersed with the surfactant used as a dispersant can drastically be increased by adding the water-soluble polymer.

The water-soluble polymer used in this case is a water-soluble polymer having no dissociation group or a water-soluble polymer having a carboxylic acid value. Examples of the water-soluble polymer having no dissociation groups include polyvinyl alcohol, polysaccharides, cellulose derivatives such as carboxymethyl cellulose, polyvinyl pyrrolidone, polyvinylmethyl ether, and the like.

As an alternative, it is also effective that a dispersion itself of disperse dyes or organic pigments is performed by using the water-soluble polymer as a dispersant and then the surfactant mentioned above is added to the prepared dispersion. The water-soluble polymer used in this case is preferably an alkali-soluble resin, more preferably an addition-polymerized resin.

Examples of the alkali-soluble and water-soluble polymer are a copolymer of a hydrophobic monomer such as styrene, styrene derivatives, vinylnaphthalene, vinylnaphthalene derivatives, alkyl esters of acrylic acid and alkyl esters of methacrylic acid, with a lyophilic monomer such as $\alpha,\beta$-ethylenically unsaturated carboxylic acid and aliphatic alcohol esters thereof, acrylic acid, methacrylic acid, maleic acid, itaconic acid, fumaric acid and derivatives thereof, and a salt thereof and so on. Water-soluble resins such as a condensation product of naphthalene sulfonate-formaldehyde and polystyrene-sulfonic acid can also be used as the water-soluble polymer.

A base that forms a salt includes, e.g., alkali metal ions and alcohol amines such as monoethanol amine, diethanoi amine and triethanol amine.

The copolymer may have any of random, block and graft structures, and its acid value is within a range of from 100 to 450, preferably from 130 to 400. The weight average molecular weight of the copolymer is preferably in the range of from 1,000 to 30,000, more preferably from 3,000 to 15,000. An amount of the water-soluble polymer used is in the range of approximately from 0.1 to 2.5% by weight based on a total ink weight when the water-soluble polymer is added to the dispersion dispersed with the surfactant.

When the dispersion is prepared by using the water-soluble polymer as a dispersant, the weight ratio of the pigment to the water-soluble polymer is in the range of from 10:3 to 10:0.5. The optimum weight ratio is experimentally determined from the viewpoints of the mean particle size, viscosity, stability and dispersion efficiency achievable by a combination of the selected pigment and water-soluble polymer. For the water-based dispersion ink of the present invention used in a bubble jet recording apparatus, the amount of the water-based dispersion ink that is not adsorbed on the pigment, but dissolved in the dispersion medium, is preferably not more than 2% by weight in the ink.

Disperse Dye

An amount of the disperse dye contained in the water-based dispersion ink for use in the present invention is preferably held in the range of from 1 to 25% by weight, more preferably from 1.5 to 20% by weight, based on a total weight of the ink.

Examples of the usable disperse dyes include:

Disperse Yellow Dyes such as C.I. Disperse Yellow 5, C.I. Disperse Yellow 42, C.I. Disperse Yellow 54, C.I. Disperse Yellow 64, C.I. Disperse Yellow 79, C.I. Disperse Yellow 82, C.I. Disperse Yellow 83, C.I. Disperse Yellow 93, C.I. Disperse Yellow 99, C.I. Disperse Yellow 100, C.I. Disperse Yellow 119, C.I. Disperse Yellow 122, C.I. Disperse Yellow 124, C.I. Disperse Yellow 126, C.I. Disperse Yellow 160, C.I. Disperse Yellow 184:1, C.I. Disperse Yellow 186, C.I. Disperse Yellow 198, C.I. Disperse Yellow 199, C.I. Disperse Yellow 204, C.I. Disperse Yellow 211, C.I. Disperse Yellow 224, and C.I. Disperse Yellow 237;

Disperse Orange Dyes such as C.I. Disperse Orange 13, C.I. Disperse Orange 29, C.I. Disperse Orange 31:1, C.I. Disperse Orange 33, C.I. Disperse Orange 49, C.I. Disperse Orange 54, C.I. Disperse Orange 55, C.I. Disperse Orange 66, C.I. Disperse Orange 73, C.I. Disperse Orange 118, C.I. Disperse Orange 119, and C.I. Disperse Orange 163;

Disperse Red Dyes such as C.I. Disperse Red 54, C.I. Disperse Red 72, C.I. Disperse Red 73, C.I. Disperse Red 86, C.I. Disperse Red 88, C.I. Disperse Red 91, C.I. Disperse Red 92, C.I. Disperse Red 93, C.I. Disperse Red 111, C.I. Disperse Red 126, C.I. Disperse Red 127, C.I. Disperse Red 134, C.I. Disperse Red 135, C.I. Disperse Red 143, C.I. Disperse Red 145, C.I. Disperse Red 152, C.I. Disperse Red 153, C.I. Disperse Red 154, C.I. Disperse Red 159, C.I. Disperse Red 164, C.I. Disperse Red 167:1, C.I. Disperse Red 177, C.I. Disperse Red 181, C.I. Disperse Red 204, C.I. Disperse Red 206, C.I. Disperse Red 207, C.I. Disperse Red 221, C.I. Disperse Red 239, C.I. Disperse Red 240, C.I. Disperse Red 258, C.I. Disperse Red 277, C.I. Disperse Red 278, C.I. Disperse Red 283, C.I. Disperse Red 311, C.I. Disperse Red 323, C.I. Disperse Red 343, C.I. Disperse Red 348, C.I. Disperse Red 356, and C.I. Disperse Red 362;

Disperse Violet Dyes such as C.I. Disperse Violet 33;

Disperse Blue Dyes such as C.I. Disperse Blue 56, C.I. Disperse Blue 60, C.I. Disperse Blue 73, C.I. Disperse Blue 87, C.I. Disperse Blue 113, C.I. Disperse Blue 128, C.I. Disperse Blue 143, C.I. Disperse Blue 148, C.I. Disperse Blue 154, C.I. Disperse Blue 158, C.I. Disperse Blue 165, C.I. Disperse Blue 165:1, C.I. Disperse Blue 165:2, C.I. Disperse Blue 176, C.I. Disperse Blue 183, C.I. Disperse Blue 185, C.I. Disperse Blue 197, C.I. Disperse Blue 198, C.I. Disperse Blue 201, C.I. Disperse Blue 214, C.I. Disperse Blue 224, C.I. Disperse Blue 225, C.I. Disperse Blue 257, C.I. Disperse Blue 266, C.I. Disperse Blue 267, C.I. Disperse Blue 287, C.I. Disperse Blue 354, C.I. Disperse Blue 358, C.I. Disperse Blue 365, and C.I. Disperse Blue 368; and Disperse Green Dyes such as C.I. Disperse Green 6:1 and C.I. Disperse Green 9; and so on.

Of the dyes listed above, preferred compounds are:

C.I. Disperse Yellow 5, C.I. Disperse Yellow 42, C.I. Disperse Yellow 83, C.I. Disperse Yellow 93, C.I. Disperse Yellow 99, C.I. Disperse Yellow 198, C.I. Disperse Yellow 211, and C.I. Disperse Yellow 224;

C.I. Disperse Orange 29, C.I. Disperse Orange 49, and C.I. Disperse Orange 73;

C.I. Disperse Red 86, C.I. Disperse Red 88, C.I. Disperse Red 92, C.I. Disperse Red 126, C.I. Disperse Red 145, C.I. Disperse Red 152, C.I. Disperse Red 159, C.I. Disperse Red 177, C.I. Disperse Red 181, C.I. Disperse Red 206, and C.I. Disperse Red 283; and C.I. Disperse Blue 60, C.I. Disperse Blue 87, C.I. Disperse Blue 128, C.I. Disperse Blue 154, C.I. Disperse Blue 165, C.I. Disperse Blue 201, C.I. Disperse Blue 214, C.I. Disperse Blue 224, C.I. Disperse Blue 257, C.I. Disperse Blue 287, and C.I. Disperse Blue 368; and so on.

It should be noted that the foregoing compounds are listed as preferred examples of the usable dyes in a not-limiting sense, and any suitable newly synthesized compound may also be used.

Pigment

An amount of the pigment contained in the water-based dispersion ink for use in the present invention is preferably held in the range of from 1 to 20% by weight, more preferably from 2 to 12% by weight, based on a total weight of the ink.

Preferred carbon black used in a black ink is one which is manufactured by the furnace method or the channel method, and has a primary particle size of from 15 to 40 nm, a specific surface area of from 50 to 300 $m^2/g$ according to the BET method, a DBP oil absorption amount of from 40 to 150 ml/100 g, a volatile component of from 0.5 to 10%, and a pH value of from 2 to 9. Examples of the carbon black pigment (C.I. Pigment Black 7) are:

No. 2300, No. 900, MCF-88, No. 33, No. 40, No. 45, No. 52, MA7, MA8, MA100, and No. 2200B (all trade name, produced by Mitsubishi Chemical Industries Co., Ltd.);

Raven 700, Raven 5750, Raven 5250, Raven 5000, Raven 3500, and Raven 1255 (all trade name, produced by Columbia Co.);

Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all trade name, produced by Cabot Co.); and Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (all trade name, produced by Deggussa AG); and the like.

Examples of the pigments used in a yellow ink are C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 108, C.I. Pigment Yellow 109, C.I. Pigment Yellow 110, C.I. Pigment Yellow 180, and C.I. Pigment Yellow 182.

Examples of the pigments used in a magenta ink are C.I. Pigment Red 5, C.I. Pigment Red 7, C.I. Pigment Red 12, C.I. Pigment Red 112, C.I. Pigment Red 122, C.I. Pigment Red 123, C.I. Pigment Red 168, C.I. Pigment Red 184, and C.I. Pigment Red 202.

Examples of the pigments used in a cyan ink are C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Pigment Blue 60, C.I. Vat Blue 4, and C.I. Vat Blue 60.

In addition, when red, green, blue, and intermediate colors are required, it is preferable to employ the following pigments solely or in a combination:

C.I. Pigment Red 209, C.I. Pigment Red 224, C.I. Pigment Red 177, C.I. Pigment Red 194, C.I. Pigment Orange 43, C.I. Vat Violet 3, C.I. Pigment Violet 19, C.I. Pigment Green 36, C.I. Pigment Green 7, C.I. Pigment Violet 23, C.I. Pigment Violet 37, and C.I. Pigment Blue 15:6.

Base

The surfactant having a phosphoric acid or carboxylic acid group and the alkali-soluble polymer compound used in the water-based dispersion ink of the present invention are required to be neutralized with a base when employed in an aqueous system. Examples of the bases employed for that purpose are organic bases such as ethanolamine, diethanolamine, triethanolamine, N-methylethanolamine, N-ethyldiethanolamine, 2-amino-2-methylpropanol, 2-ethyl-2-amino-1,3-propanediol, 2-(2-aminoethyl) ethanolamine, tris(hydroxymethyl)aminomethane, ammonia, piperidine, morpholine, bis-β-hydroxyethylurea and the like. The optimum one of the usable bases is preferably non-volatile, stable and highly water-retentive. An amount of the base used is calculated as an amount required to neutralize an acid. Depending on cases, the base may be used in amount exceeding the equivalent of the acid. This aims to improve dispersibility, adjust a pH-value of the ink, control recording properties, and increase moisture-retentivity.

Water-Soluble Organic Solvent

The water-soluble organic solvent used in the present invention is any of organic solvents miscible with water. These solvents can be classified into three groups; (1) a first group of solvents, which are highly moisture-retentive, are difficult to evaporate, and have superior lyophilicity, (2) a second group of solvents which have hydrophobic groups at terminals, show good wetting to the hydrophobic surface, and are liable to dry through evaporation, and (3) a third group of solvents (monohydric alcohols) which show a proper degree of wetting and have low viscosity.

(1) The solvents belonging to the first group include, e.g., ethylene glycol, diethylene glycol, triethylene glycol, tripropylene glycol, glycerin, 1,2,4-butanetriol, 1,2,6-hexanetriol, 1,2,5-pentanetriol, 1,2-butanediol, 1,3-butanediol, 1,4-butanediol, dimethylsulfoxide, diacetonealcohol, glycerin monoallyl ether, propylene glycol, butylene glycol, polyethylene glycol 300, thiodiglycol, N-methyl-2-pyrrolidone, 2-pyrrolidone, γ-butyrolactone, 1,3-dimethyl-2-imidazolidinone, sulforan, trimethylolpropane, trimethylolethane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, β-hydroxyethylurea, urea, acetonyl acetone, pentaerythritol, 1,4-cyclohexanediol, and the like.

(2) The solvents belonging to the second group include, e.g., hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, dipropylene glycol monopropyl ether, dipropylene glycol monobutyl ether, tripropylene glycol monomethyl ether, glycerin monoacetate, glycerin diacetate, glycerin triacetate, ethylene glycol monomethyl ether acetate, diethylene glycol monomethyl ether acetate, cyclohexanol, 1,2-cyclohexanediol, 1-butanol, 3-methyl-1,5-pentanediol, 3-hexene-2,5-diol, 2,3-butanediol, 1,5-pentanediol, 2,4-pentanediol, 2,5-hexanediol, and the like.

(3) The solvents belonging to the third group include, e.g., ethanol, n-propanol, 2-propanol, 1-methoxy-2-propanol, furfuryl alcohol, tetrahydrofurfuryl alcohol, and the like.

One or more selected from among the above-listed water-soluble organic solvents can be used in the present invention.

A total amount of one or more water-soluble organic solvents is in the range of approximately from 5 to 40% by weight based on a total weight of the ink.

Other Additives

The water-based dispersion ink of the present invention can contain other additives such as a pH-adjuster and an antiseptic agent. Typical one of commercially available antiseptic agents which are stable and effective in an alkaline region is Proxel (trade name, produced by Zeneca, England).

The basic physical properties of the ink consisted of the above-mentioned materials are summarized as follows: viscosity of from 2 to 6 mPa.s, surface tension of from 35 to 55 mN/m, pH of from 7.0 to 10.0, mean particle size of from 80 to 200 nm, preferably, from 80 to 150 nm, more preferably from 80 to 120 nm.

The content of water in the ink is usually in the range of from 10 to 3% by weight, preferably from 25 to 87% by weight.

In the present invention, a viscosity and a surface tension are measured at 25° C., respectively.

Now, the process of preparing the water-based dispersion ink of the present invention will be described below.

Fine Particle Dispersion

A fine particle dispersion for the water-based dispersion ink can be prepared using the materials of the present invention by means of a procedure as follows.

A wet cake of a pigment or disperse dye is subjected to a pre-mixing treatment in a solution of an anionic water-soluble polymer, then to a milling treatment in a dispersing apparatus with a high shearing speed, and thereafter to centrifugal separation to remove coarse particles. If the desired particle size cannot be achieved with a high yield by using one type of dispersing apparatus, several types of dispersing apparatus may be used in a combined manner. It is effective to employ, by way of example, a method in which a mixing apparatus rotatable at a high speed exceeding 10,000 rpm without using beads, a method of contacting the solution of a water-soluble polymer with a pigment at a high speed in the form of high-pressure jets, or a method in which bead milling and ultrasonic dispersion or the like are combined.

After that, other materials necessary for preparing the desired ink are added to the dispersion, and then subjected to an aging treatment, in some cases, at a raised temperature of 35° to 50° C. Subsequently, centrifugal separation and filtering under pressure are carried out to finally obtain the desired mean particle size. For an organic pigment or a disperse dye which is difficult to have a small particle size, it is effective to employ a method to make a small particle size by suppressing crystal growth in the presence of a water-soluble polymer or a surfactant at the time of synthesizing a coloring matter, or a method to use a starting material in the form of a wet cake having a small particle size and an increased wetting degree by suppressing crystal growth upon contacting with a water-soluble polymer or the surfactant at a stage of precipitating a crystal after completion of synthesis.

The water-based dispersion ink of the present invention is applicable to designs adapted for all the fields in which disperse dyes or pigments are used in the bubble jet system to conduct recording. Specifically, the water-based dispersion ink of the present invention can be practiced in writing implements, color printers, color plotters, poster printing, signboard printing, light printing, cloth printing, color filters for liquid crystal displays, and so on.

An ink-jet recording method using the water-based dispersion ink of the present invention will be described below.

A preferred method and apparatus to conduct recording by using the ink of the present invention are arranged such that thermal energy corresponding to a recording signal is applied to the ink in a chamber of a recording head, and an ink droplet is produced with the applied thermal energy.

Figure 2:
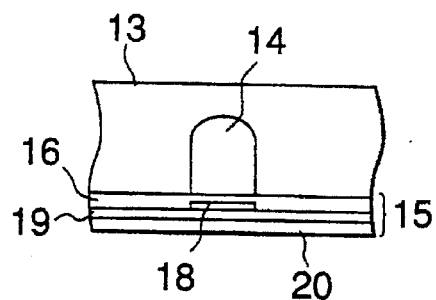
FIG. 2 is a transverse cross-sectional view of the head portion of the ink-jet recording apparatus.
Figure 3:
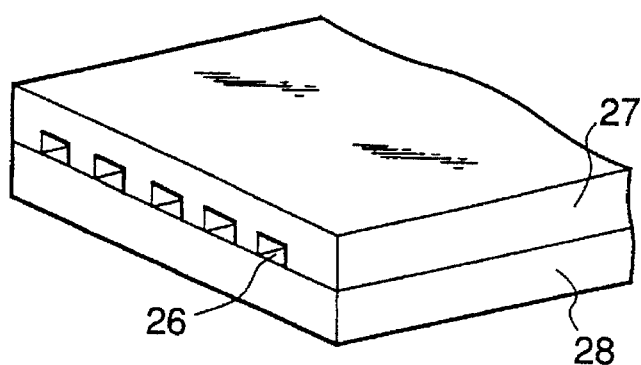
FIG. 3 is a perspective view of a head including multiple head portions each shown in FIG. 1.

One example of structure of the head as a primary part of the recording apparatus is shown in FIGS. 1, 2 and 3.

A head 13 is constructed by bonding a glass, ceramic or plastic plate having grooves 14 through which the ink is passed, and a heat generating head 15 for use in heat-sensitive recording (the figure showing a thin film head only by way of example) with each other. The heat generating head 15 comprises a protective film 16 formed of, e.g., silicon oxide, aluminum electrodes 17-1 and 17-2, a heat-generating-resistance material layer 18 formed of, e.g., nichrome, a heat accumulating layer 19, and a base plate 20 formed of a material, such as alumina, having a high heat-radiating ability.

An ink 21 is filled to reach an ejection orifice (fine hole) 22 and forms a meniscus 23 under pressure (generated by a not-shown mechanism).

When an electric signal is applied to the electrodes 17-1 and 17-2, a region of the heat generating head 15 indicated by n abruptly generates heat so that an air bubble is produced in the ink 21 contacting the region n. The meniscus 23 is projected forwardly with a resultant pressure, causing the ink 21 to eject and fly in the form of recording droplets 24 from the orifice 22 toward a recording medium 25.

FIG. 3 shows an appearance of a multi-head comprising a number of heads, shown in FIG. 1, arranged side by side. The multi-head is constructed by bonding a glass plate 27 which has multiple channels 26 formed therein, and a heat generating head 28 which is similar to that described above by referring to FIG. 1, with each other.

Incidentally, FIG. 1 is a sectional view of the head 13 taken along an ink flow passage, and FIG. 2 is a sectional view taken along line 2—2 in FIG. 2.

Figure 4:
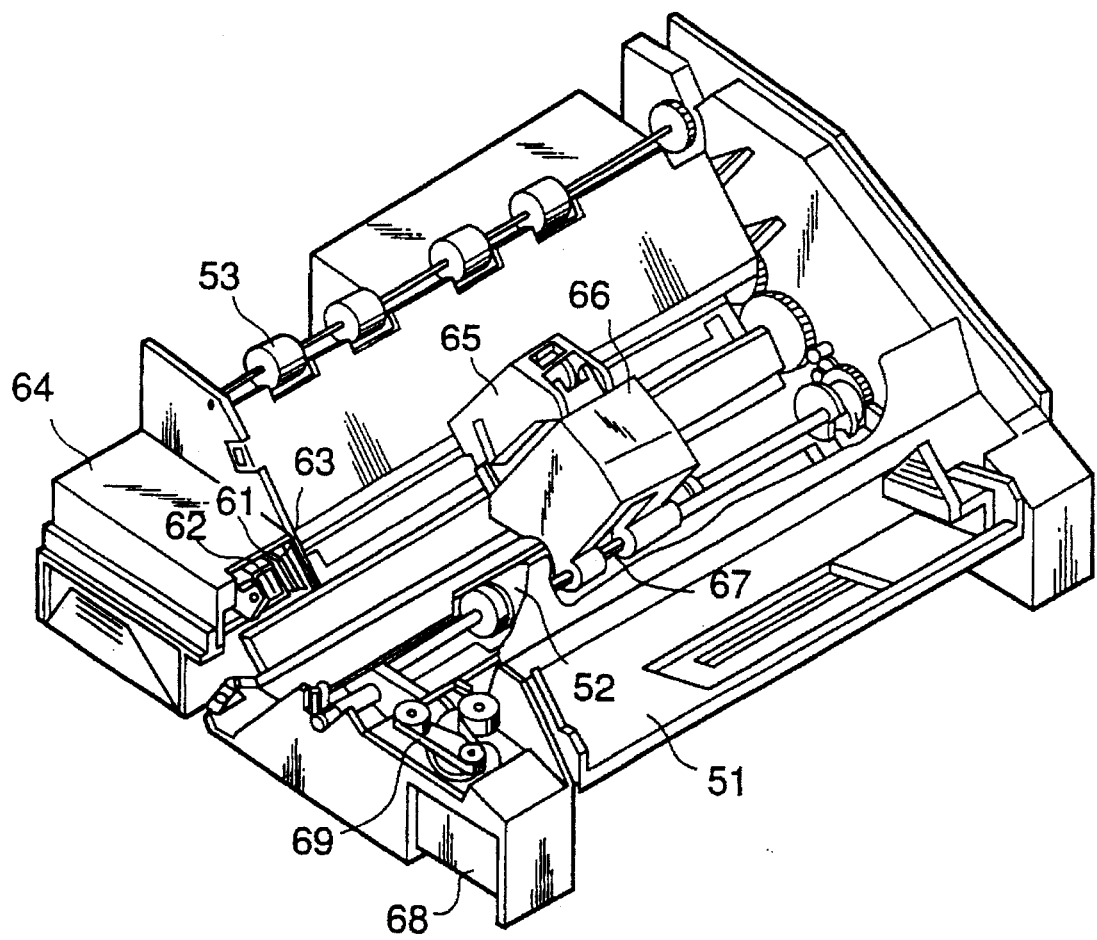
FIG. 4 is a perspective view showing one example of the ink-jet recording apparatus.

FIG. 4 shows one example of an ink-jet recording apparatus in which the above-described head is incorporated. In FIG. 4, denoted by 61 is a blade as a wiping member in the form of a cantilever, of which one end is held by a blade holding member to become a fixed end. The blade 61 is disposed at a position adjacent a recording area covered by the recording head.

In the illustrated embodiment, the blade 61 is held in such a manner as to project into the travel path of the recording head. Reference numeral 62 is a cap which is disposed in its home position adjacent the blade 61 and is movable in a direction perpendicular to the direction of movement of the recording head such that it comes into contact with the ink ejection surface for capping the same. Reference numeral 63 is an ink absorber which is disposed adjacent the blade 61 and is held in such a manner as to project into the travel path of the recording head similarly to the blade 61. The blade 61, the cap 62 and the absorber 63 cooperatively construct an ejection recovery unit 64 in which the blade 61 and the absorber 63 serve to remove moisture, dust, dirt, etc. on the ink ejection surface.

Reference numeral 65 is a recording head which includes an ejection energy generating means and ejects the ink onto the recording medium which is disposed in opposed relation to the ink ejection surface including ejection ports arrayed therein, for thereby recording an image. 66 is a carriage on which the recording head 65 is mounted to be reciprocally moved together. The carriage 66 is slidably engaged with a guide shaft 67 and is also connected (though not shown) at its part to a belt 69 driven by a motor 68. With such an arrangement, the carriage 66 is movable along the guide shaft 67 so that the recording head 65 can move over the recording area and an area adjacent thereto.

Reference numeral 51 is a paper feed portion through which the recording medium is inserted, and reference numeral 52 is a paper feeding roller driven by a motor (not shown). With such an arrangement, the recording medium is fed to a position opposed to the ink ejection surface of the recording head, and is then guided to a paper discharge portion, in which paper discharging rollers 53 are disposed, with the progress of recording.

In the above arrangement, when the recording head 65 is returned to the home position upon the end of recording or other reason, the cap 62 in the head recovery unit 64 is retracted from the travel path of the recording head 65, but the blade 61 is held projected into the travel path. As a result, the ink ejection surface of the recording head 65 is wiped by the blade 61. When the cap 62 is brought into contact with the ink ejection surface of the recording head 65 for capping the same, it is moved so as to project into the travel path of the recording head.

When the recording head 65 is moved from the home position to the recording start position, the cap 62 and the blade 61 are in the same positions as in the above wiping state. During that movement, therefore, the ink ejection surface of the recording head 65 is likewise wiped again.

The movement of the recording head to the home position adjacent the recording area is performed not only upon the end of recording or the recovery of ejection, but also at predetermined intervals during the time in which the recording head is reciprocally moved over the recording area for recording an image. For each of such movements, the wiping of the ink ejection surface of the recording head is made.

Figure 5:
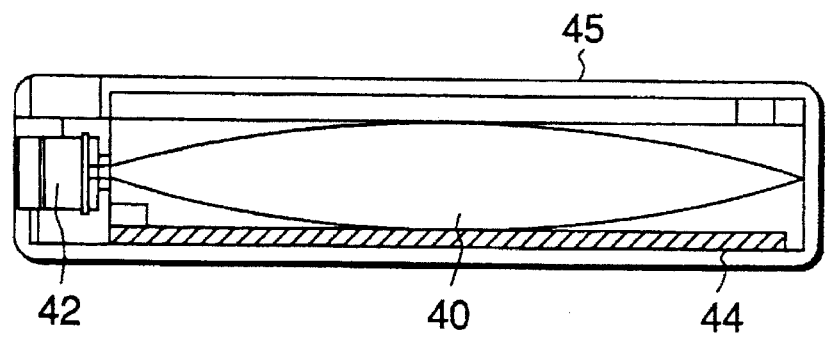
FIG. 5 is a longitudinal cross-sectional view of an ink cartridge.

FIG. 5 shows one example of an ink cartridge 45 containing the ink supplied to the head through an ink supply member, e.g., a tube. In FIG. 5, reference numeral 40 is an ink storage portion, e.g., an ink bag, which contains the ink to be supplied and has a rubber-made plug 42 provided at it distal end. By sticking a needle (not shown) through the plug 42, the ink in the ink bag 40 can be supplied to the head. Reference numeral 44 is an ink absorber for accommodating waste ink. The ink storage portion for use in the present invention preferably has an ink contact surface formed of polyolefin, in particular, polyethylene.

Figure 6:
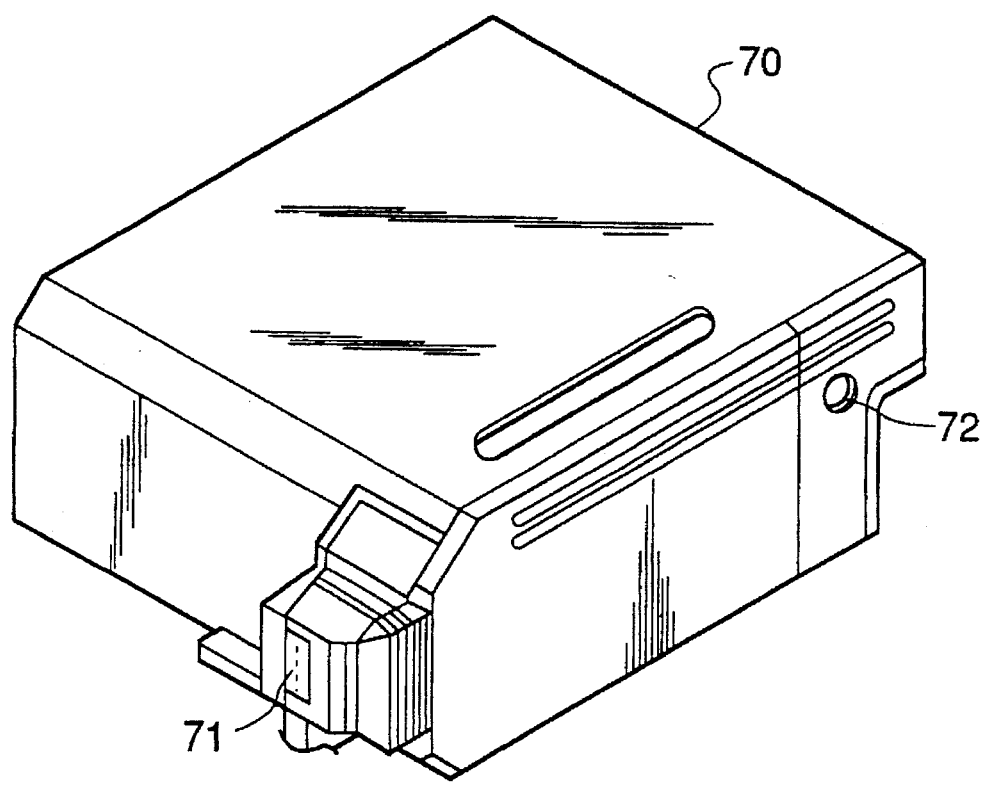
FIG. 6 is a perspective view of a recording unit.

The ink-jet recording apparatus of the present invention is not limited to the above-described construction in which the head and the ink cartridge are separate from each other, but can also suitably be applied to the construction in which both the members are integral with each other as shown in FIG. 6.

Referring to FIG. 6, reference numeral 70 is a recording unit in which an ink storage portion containing the ink therein, e.g., an ink absorber, is housed. The ink held in the ink absorber is ejected in the form of ink droplets through a head portion 71 having a plurality of orifices. In the present invention, a material of the ink absorber is preferably of poly-urethane.

Reference numeral 72 is an atmosphere communicating port via which the interior of the recording unit is communicated with the atmosphere. The recording unit 70 is to be employed in place of the recording head shown in FIG. 4, and can be attached to the carriage 66 in a detachable manner.

Next, the present invention will be described below in more detail with reference to Examples. In the following description, "part(s)" represents weight part(s), "weight-average molecular weight" represents a value measured based on the GPC method with a styrene polymer as a reference, and "mean particle size" represents a value measured based on the dynamic light scattering method.

EXAMPLE 1

Disperse Dye Blue Ink

The following blue dispersion DBL was prepared by using Phosphanol RE-610 (tradename, produced by Toho Chemicals Co., Ltd., HLB 12.6) as a dispersant.

Dispersion DBL

Dispersion DBL was prepared using components of:

| | |
|---|---|
| Phosphanol RE-610 aqueous solution (20% aqueous solution neutralized with monoethanol amine; pH = 9.0) | 40 parts, |
| Wet cake of C.I. Disperse Blue 60 (in the term of a solid component) | 40 parts, |
| Diethylene glycol | 10 parts, and |
| Water | 110 parts. |

The above components were put in a batch type vertical sand mill and subjected to pre-mixing for 30 minutes. Then, zirconium beads having a diameter of 1 mm were filled as media in the mill, and a dispersion treatment was continued for 5 hours at 4,000 rpm while cooling the mill with water. The solution after the dispersion had viscosity of 6 mPa.s and pH of 9.0. This disperse solution was subjected to a centrifugal separation under conditions of 12,000 rpm for 20 minutes to remove coarse particles. As a result, a dispersion DBL with a solid component of about 20% and a mean particle size of 160 nm was obtained.

Ink BL-1

Components of:

| | |
|---|---|
| Dispersion DBL | 50 parts, |
| Thiodiglycol | 15 parts, |
| Ethanol | 5 parts, and |
| Water | 30 parts | were well mixed together and filtered under pressure by using a membrane filter of 0.25 μm. An ink-jet recording blue ink BL-1 with viscosity of 2.5 mPa.s, surface tension of 43 mN/m, and pH of 9.7 was obtained.

Ink BL-2

Components of:

| | |
|---|---|
| Dispersion DBL | 50 parts, |
| Thiodiglycol | 15 parts, |
| Isopropylalcohol | 5 parts, |
| Styrene-acrylic acid-ethyl acrylate copolymer P-1 (20% by weight aqueous solution of solid component having acid value of 250 and weight-average molecular weight of 13,000, neutralizer: monoethanolamine) | 5 parts, and |
| Water | 25 parts | were well mixed together and filtered under pressure by using a membrane filter of 0.25 μm. An ink-jet recording blue ink BL-2 with viscosity of 2.8 mPa.s, surface tension of 43 mN/m, and pH of 9.7 was obtained.

EXAMPLE 2

Disperse Dye Red Ink

The following red dispersion DR was prepared by using DLP-10 (tradename, produced by Nikko Chemicals Co., Ltd., HLB 17.0) as a dispersant.

Dispersion DR

Dispersion DR was prepared using components of:

| | |
|---|---|
| DLP-10 Aqueous solution (20% aqueous solution neutralized with monoethanol amine; pH = 9.3) | 40 parts, |
| Wet cake of C.I. Disperse Red 88 (in the term of a solid component) | 40 parts, |
| Diethylene glycol | 10 parts, and |
| Water | 110 parts. |

The above components were subjected to the dispersion process in a like manner to Example 1. As a result, a dispersion DR with viscosity of 8.5 mPa.s, pH of 9.0 and a mean particle size of 145 nm was obtained.

Ink R-1

Components of:

| | |
|---|---|
| Dispersion DR | 50 parts, |
| Diethylene glycol | 10 parts, |
| Ethylene glycol | 10 parts, and |
| Water | 30 parts | were well mixed together and filtered under pressure by using a membrane filter of 0.25 μm. An ink-jet recording red ink R-1 with viscosity of 3.0 mPa.s, surface tension of 45 mN/m, and pH of 9.0 was obtained.

Ink R-2

Components of:

| | |
|---|---|
| Dispersion DR | 50 parts, |
| Triethylene glycol | 15 parts, |
| N-methyl pyrrolidone | 10 parts, |
| Styrene-maleic acid-n-butyl acrylate resin P-2 (20% by weight aqueous solution of solid component having acid value of 210 and weight-average molecular weight of 7,000, neutralizer: monoethanolamine) | 3 parts, and |
| Water | 22 parts | were well mixed together and filtered under pressure by using a membrane filter of 0.25 μm. An ink-jet recording red ink R-2 with viscosity of 2.5 mPa.s, surface tension of 45 mN/m, and pH of 9.4 was obtained.

EXAMPLE 3

Disperse Dye Yellow Ink

The following yellow dispersion DY was prepared by using DDP-10 (tradename, produced by Nikko Chemicals Co., Ltd., HLB 13.5) as a dispersant.

Dispersion DY

Components of:

| | |
|---|---|
| DDP-10 Aqueous solution (20% aqueous solution neutralized with monoethanol amine; pH = 9.5) | 30 parts, |
| Wet cake of C.I. Disperse Yellow 198 (in the term of solid component) | 40 parts, |
| Ethylene glycol | 20 parts, and |
| Water | 110 parts | were subjected to the dispersion process in a like manner to Example 1. As a result, a dispersion DY with viscosity of 5.5 mPa.s, pH of 9.5 and a mean particle size of 150 nm was obtained.

Ink Y-1

Components of:

| | |
|---|---|
| Dispersion DY | 30 parts, |
| Thiodiglycol | 20 parts, |
| Isopropyl alcohol | 5 parts, and |
| Water | 45 parts | were well mixed together and filtered under pressure by using a membrane filter of 0.25 μm. An ink-jet recording yellow ink Y-1 with viscosity of 2.6 mPa.s, surface tension of 45 mN/m, and pH of 9.4 was obtained.

Ink Y-2

Components of:

| | |
|---|---|
| Dispersion DY | 30 parts, |
| Thiodiglycol | 20 parts, |
| Ethanol | 5 parts, |
| Styrene-acrylic acid-ethyl acrylate copolymer P-3 (20% by weight aqueous solution of solid component having acid value of 300 and weight-average molecular weight of 4,500, neutralizer: monoethanolamine | 10 parts, and |
| Water | 35 parts | were well mixed together and filtered under pressure by using a membrane filter of 0.25 μm. An ink-jet recording yellow ink Y-2 with viscosity of 3.0 mPa.s, surface tension of 43 mN/m, and pH of 9.6 was obtained.

EXAMPLE 4

Disperse Dye Magenta Ink

The following magenta dispersion DM was prepared by using an anionic polymer P-2 (styrene-maleic acid-n-butyl acrylate copolymer: 20% by weight aqueous solution of solid component having an acid value of 210 and weight-average molecular weight of 7,000, neutralizer: triethanolamine) as a dispersant.

Dispersion DM

Components of:

| P-2 aqueous solution (20% by weight solid component) | 30 parts, |
|---|---|
| C.I. Disperse Red 348, (HOSTAPERM Pink E, tradename, produced by Hoechst Co.) | 30 parts, |
| Ethylene glycol | 15 parts, and |
| Water | 125 parts | were subjected to the dispersion process in a like manner to Example 1. As a result, a dispersion DM with viscosity of 10 mPa.s, pH of 9.8 and a mean particle size of 180 nm was obtained. The following ink was prepared by using the dispersion DM.

Ink M-1

Ink M-1 was prepared from Components of:

| Dispersion DM | 45 parts, |
|---|---|
| 20% by weight Aqueous solution of monoethanolamine salt of Phosphanol RS-610 (tradename, produced by Toho Chemicals Co., Ltd., HLB 10.5) | 5 parts, |
| Glycerin | 10 parts, |
| Diethylene glycol | 10 parts, and |
| Water | 30 parts. |

The resulting ink had viscosity of 2.4 mPa.s, surface tension of 42 mN/m, and pH of 9.3.

EXAMPLE 5

Disperse Dye Cyan Ink

The following cyan dispersion DC was prepared by using an anionic polymer P-4 (styrene-methyl-methacrylate-acrylic acid-ethylacrylate copolymer: 20% by weight aqueous solution of solid component having an acid value of 180 and weight-average molecular weight of 11,000, neutralizer: diethanolamine) as a water-soluble polymer.

Dispersion DC

Components of:

| P-4 aqueous solution (20% by weight solid component) | 30 parts, |
|---|---|
| C.I. Disperse Blue 60, | 24 parts, |
| Diethylene glycol | 15 parts, and |
| Water | 135 parts | were subjected to the dispersion process in a like manner to Example 1. As a result, a dispersion DC with viscosity of 13.5 mPa.s, pH of 9.3 and a mean particle size of 200 nm was obtained.

Ink C-1

Components of:

| Dispersion DC | 40 parts, |
|---|---|
| 20% by weight Aqueous solution of triethanolamine salt of Phosphanol RS-710 (trade-name, produced by Toho Chemicals Co., Ltd., HLB 13.3) | 10 parts, |
| N-methylpyrrolidone | 5 parts, |
| Glycerin | 15 parts, |
| Polyethylene glycol 200 | 5 parts, and |
| Water | 25 parts | were well mixed together and, as a result, an ink-jet recording cyan ink with viscosity of 3.1 mPa.s, surface tension of 41 mN/m, and pH of 9.4 was obtained.

EXAMPLE 6

Organic Pigment Magenta Ink

The following magenta dispersion PM was prepared by using the anionic polymer P-2 (styrene-maleic acid-n-butylacrylate copolymer: 20% by weight aqueous solution of solid component having an acid value of 210 and weight-average molecular weight 7,000, neutralizer: triethanolamine) as a dispersant.

Dispersion PM

Components of:

| P-2 aqueous solution (20% by weight solid component) | 22 parts, |
|---|---|
| C.I. Pigment Red 122, (HOSTAPERM Pink E, tradename, produced by Hoechst Co.) | 24 parts, |
| Ethylene glycol | 15 parts, and |
| Water | 135 parts | were subjected to the dispersion process in a like manner to Example 1. As a result, a dispersion PM with viscosity of 10 mPa.s, pH of 9.8 and a mean particle size of 158 nm was obtained.

Ink PM-1

Ink PM-1 was prepared by using components of:

| Dispersion PM | 45 parts, |
|---|---|
| 20% by weight Aqueous solution of monoethanolamine salt of Phosphanol RS-610 (tradename, produced by Toho Chemicals Co., Ltd., HLB 10.5) | 5 parts, |
| Glycerin | 10 parts, |
| Diethylene glycol | 10 parts, and |
| Water | 30 parts. |

The resulting ink had viscosity of 3.2 mPa.s, surface tension of 44 mN/m, and pH of 9.5.

EXAMPLE 7

Organic Pigment Cyan Ink

The following cyan dispersion PC was prepared by using the anionic polymer P-4 (styrene-methyl-methacrylate-acrylic acid-ethylacrylate copolymer: 20% by weight aqueous solution of solid component having an acid value of 180 and weight-average molecular weight 11,000, neutralizer: diethanolamine) as a water-soluble polymer.

Dispersion PC

Components of:

| | |
|---|---|
| P-4 aqueous solution (20% by weight solid component) | 26 parts, |
| C.I. Pigment Blue 15:3 (Heliogen Blue D7030, tradename, produced by BASF Co.) | 24 parts, |
| Diethylene glycol | 15 parts, and |
| Water | 135 parts | were subjected to the dispersion process in a like manner to Example 1. As a result, a dispersion PC with viscosity of 13 mPa.s, pH of 9.3 and a mean particle size of 130 nm was obtained.

Ink PC-1

Components of:

| | |
|---|---|
| Dispersion PC | 40 parts, |
| 20% by weight Aqueous solution of triethanolamine salt of Phosphanol RS-710 (tradename, produced by Toho Chemicals Co., Ltd., HLB 13.3) | 10 parts, |
| N-methylpyrrolidone | 5 parts, |
| Glycerin | 15 parts, |
| Polyethylene glycol 200 | 5 parts, and |
| Water | 25 parts | were well mixed together and, as a result, an ink-jet recording cyan ink with viscosity of 4.2 mPa.s, surface tension of 45 mN/m, pH of 9.7, and a mean particle size of 140 nm was obtained.

EXAMPLE 8

Organic Pigment Magenta Ink

A water-based dispersion of Pigment Red 122 (HOSTAPERM Pink E, tradename, produced by Hoechst Co.) was prepared as follows by using monoethanolamine salt of a surfactant of carboxylic acid type expressed by the structural formula (12) above (pH=9.5, produced by Sunnopco Co., Ltd.) as a dispersant.

Dispersion QR

Components of:

| | |
|---|---|
| Pink E | 25 parts, |
| Monoethanolamine salt of surfactant expressed by structural formula (12) above | 5 parts, |
| Ethylene glycol | 15 parts, |
| Antifoam (acetylenediol) | 0.2 part, and |
| Water | 125 parts | were first well mixed together and then subjected to the dispersion process in a like manner to Example 1 to obtain a dispersion. The dispersion had a solid component of 14%, viscosity of 7.8 mPa.s, surface tension of 35 mN/m, pH of 9.0 and a mean particle size of 165 nm.

Ink PM-2

Ink PM-2 was prepared from components of:

| | |
|---|---|
| Dispersion QR | 40 parts, |
| Glycerin | 15 parts, |
| Triethylene glycol monomethyl ether | 15 parts, and |
| Water | 30 parts. |

The resulting ink had viscosity of 3.2 mPa.s, surface tension of 46 mN/m, and pH of 9.0.

COMPARATIVE EXAMPLE 1

The following yellow dispersion DY-2 was prepared by using the anionic polymer P-2 (styrene-maleic acid-n-butylacrylate copolymer: 20% by weight aqueous solution of solid component having an acid value of 210 and weight-average molecular weight of 7,000, neutralizer: triethanolamine) as a dispersant.

Dispersion DY-2

Components of:

| | |
|---|---|
| P-2 Aqueous solution (20% by weight solid component) | 22 parts, |
| Wet cake of C.I. Disperse Yellow 198 (in the term of solid component) | 40 parts, |
| Ethylene glycol | 20 parts, and |
| Water | 110 parts | were subjected to the dispersion process in a like manner to Example 2. As a result, a dispersion DY-2 with viscosity of 12.0 mPa.s, pH of 9.8 and a mean particle size of 200 nm was obtained.

Ink YC-1

Components of:

| | |
|---|---|
| Dispersion DY-2 | 30 parts, |
| Thiodiglycol | 20 parts, |
| Isopropyl alcohol | 5 parts, and |
| Water | 45 parts | were well mixed together and filtered under pressure by using a membrane filter of 0.25 μm. An ink with viscosity of 3.8 mPa.s, surface tension of 44 mN/m, and pH of 9.5 was obtained.

COMPARATIVE EXAMPLE 2

Ink MC-1

Ink MC-1 was prepared in the same manner as in Example 4, provided that only Phosphanol RS-610 is omitted from the components of ink M-1 of Example 4 and a content of water is increased as a corresponding amount. This ink had viscosity of 3.0 mPa.s, surface tension of 47 mN/m, and pH of 9.5.

Test Method

Printing Endurance Test

The inks prepared in the above Examples and Comparative Examples were each filled through an ink supply tube in an ink-jet recording apparatus on which a bubble jet recording head having 64 nozzles with 360 dpi was mounted. The recording apparatus was set to have a driving frequency of 4 kHz and an amount of ink droplets per dot of 80 ng. Under these conditions, a continuous ejection test was carried out by using the nozzles on every other nozzle, i.e., 32 nozzles, and applying $5\times10^8$ pulses.

Determination was made by, after an initial ejection of $5\times10^8$ pulses, printing a test document including a text, a solid print and ruled lines, and then evaluating a deterioration in a print quality. Evaluated results are listed in Table 1 below.

Printing Endurance was ranked in accordance with following standard:

A: Sharp characters with high density, and no reduction in ejection speed of ink droplets, B: Sharp characters, uniform and clear solid printing, and ruled lines with no distortions, C: Slightly blurred characters, solid printing with density reduced, and ruled lines with distortions, and D: Blurred characters difficult to read, non-uniform and faint solid painting, and scattered ruled lines and occurrence of no ink ejection.

Of these rank marks, A and B represent levels at which the ink can practically be used with no problems.

Preservation Stability Test

Each 50 ml of the inks prepared in the above Examples and Comparative Examples was set in a shot heat-resistant bottle with net volume of 100 ml and, after sealing the bottle, it was left to stand for an accelerated preservation test at 60° C. for three months. Determination was made by measuring viscosity of the ink after the preservation period and evaluating quality of the preserved ink. Evaluated results are listed in Table 1 below.

Preservation Stability was ranked in accordance with following standard:

A: No appreciable changes in viscosity, mean particle size and pH-value,

B: Viscosity increase was within 10% with respect to the initial value and a sediment was not appreciable. Or an increase in mean particle size was within 20%, C: Viscosity increase was in the range of 10 to 50% compared with the initial value and a sediment was appreciable. Or an increase in mean particle size was in the range of from 20 to 50%, and D: Ink was gelled, or a hard sediment was produced.

Of these rank marks, A and B represent levels at which the ink can practically be used with no problems.

Textile Printability Test

Each of the inks prepared in the above Examples 1, 2 and 3 and Comparative Examples 1 and 2 was filled in an ink-jet recording apparatus on which a bubble jet recording head having 64 nozzles with 360 dpi was mounted, and a color image was recorded on a polyester cloth. After the recording, the cloth was heated in steam at 180° C. for 8 minutes and then washed in an ordinary manner to obtain a color print. Printing uniformity of the resulting color print was evaluated by visually judging the same. Evaluated results are listed in Table 1 below.

Textile Printability was ranked in accordance with following standard:

A: Clear print and no color variations in the printed area,

B: Slight color variations with distortions and blurs occurred, and

C: Color variations with appreciable distortions and blurs and faint density.

Of these rank marks, A represents a level at which the print can practically be used with no problems.

TABLE 1

|  | Ink | Ejection endurance | Preservation stability | Textile printability |
|---|---|---|---|---|
| Example 1 | BL-1 | A | B | A |
|  | BL-2 | A | A | A |
| Example 2 | R-1 | A | B | A |
|  | R-2 | A | A | A |
| Example 3 | Y-1 | A | B | A |
|  | Y-2 | A | A | A |
| Example 4 | M-1 | B | A | — |
| Example 5 | C-1 | B | A | — |
| Example 6 | PM-1 | B | A | — |
| Example 7 | PC-1 | B | A | — |
| Example 8 | PM-2 | B | A | — |
| Comp. Ex.1 | YC-1 | D | C | B |
| Comp. Ex.2 | MC-1 | D | C | B |

As described above, the water-based dispersion ink of the present invention is an ink suitable for bubble jet system that employs a dispersion of disperse dyes or organic pigments with the mean particle size adjusted to be not larger than 0.2 μm, and can stably be ejected when used in bubble jet recording apparatus because of having superior dispersion stability.

Also, according to the water-based dispersion ink of the present invention, and the ink-jet recording method and apparatus using the ink, when a color image is recording on ordinary paper, cloths, metals, plastics or the like, there can be achieved prints with neither blur nor feathering, good fixation, superior coloring ability, and high fastness.

What is claimed is:

1. A water-based dispersion ink for a bubble jet system comprising water, a water-soluble organic solvent, a disperse dye, a surfactant, and an alkali- and water-soluble polymer having a carboxylic acid value, wherein the surfactant is a polyoxyethylene alkyl ether having an anionic group selected from the group consisting of a phosphoric acid and a carboxylic acid or a polyoxyethylene alkylphenyl ether having a carboxylic acid, at the ethylene oxide terminal and also having an HLB equal to or more than 10, wherein said surfactant is contained in an amount of from 0.1 to 3% by weight and said alkali- and water-soluble polymer is contained in an amount of from 0.1 to 2.5% by weight, based on a total weight of the ink, respectively.

2. A water-based dispersion ink for bubble jet system according to claim 1, wherein the anionic group of said surfactant is neutralized with alcohol amines.

3. A water-based dispersion ink for bubble jet system according to claim 1, wherein said disperse dye is dispersed by using said surfactant.

4. A water-based dispersion ink for bubble jet system according to claim 1, wherein said disperse dye is dispersed by using said water-soluble polymer.

5. A water-based dispersion ink for a bubble jet system consisting of water, a water-soluble organic solvent, a pigment, and a surfactant, wherein the surfactant is a polyoxyethylene alkyl ether or a polyoxyethylene alkylphenyl ether having an anionic group selected from the group consisting of a phosphoric acid and a carboxylic acid, at the ethylene oxide terminal and also having an HLB equal to or more than 10, and wherein said surfactant is contained in an amount of from 0.1 to 3% by weight based on a total weight of the ink.

6. A water-based dispersion ink for bubble jet system according to claim 5, wherein said pigment is dispersed by using said surfactant.

7. A water-based dispersion ink for bubble jet system according to claim 5, wherein the anionic group of said surfactant is neutralized with alcohol amines.

8. An ink-jet recording method by which droplets of ink formed by an ink-jet process are applied on a recording medium to perform recording, wherein the water-based dispersion ink as recited in any one of claims 1 to 6, 5 or 7 is employed as said ink.

9. An ink-jet recording method according to claim 8, wherein said ink-jet process is carried out by applying thermal energy to said ink.

10. An ink-jet recording method according to claim 9, wherein said ink is ejected to perform the recording from a recording head which utilizes film boiling of a thin film heater as a source for generating ejection energy.

11. An ink cartridge which has an ink storage portion containing ink, wherein the water-based dispersion ink as recited in any one of claims 1 to 6 is employed as said ink.

12. A recording unit comprising an ink storage portion containing ink and a head portion for ejecting said ink in the form of ink droplets, wherein the water-based dispersion ink as recited in any one of claims 1 to 7 is employed as said ink.

13. A recording unit according to claim 12, wherein said ink in said head portion is ejected by applying thermal energy to said ink.

14. An ink-jet recording apparatus by which droplets of ink formed by an ink-jet process are deposited on a recording medium to perform recording, wherein said apparatus includes the ink cartridge as recited in claim 11.

15. An ink-jet recording apparatus by which droplets of ink formed by an ink-jet process are deposited on a recording medium to perform recording, wherein said apparatus includes the recording unit as recited in claim 12.

* * * * *

UNITED STATES PATENT AND TRADEMARK OFFICE
CERTIFICATE OF CORRECTION

PATENT NO. : 5,658,376
DATED : August 19, 1997
INVENTOR(S) : HIROMICHI NOGUCHI, ET AL.

It is certified that error appears in the above-identified patent and that said Letters Patent is hereby corrected as shown below:

COLUMN 1:

Line 13, "particle," should read --particle--.

COLUMN 4:

Line 9, "their capabilities each other" should read --each other's capabilities--.
Line 44, "form" should read --from--.

COLUMN 6:

Line 55, "form" should read --from--.

COLUMN 7:

Line 46, "diethanoi" should read --diethanol--.

COLUMN 13:

Line 59, "it" should read --its--.

UNITED STATES PATENT AND TRADEMARK OFFICE
CERTIFICATE OF CORRECTION

PATENT NO. : 5,658,376
DATED : August 19, 1997
INVENTOR(S) : Hiromichi Noguchi, e.t al.

It is certified that error appears in the above-identified patent and that said Letters Patent is hereby corrected as shown below:

<u>Column 23</u>:

Line 10, "1 to 6, 5 Or 7" should read --1 to 7--.

Signed and Sealed this

Second Day of June, 1998

Attest:

BRUCE LEHMAN

Attesting Officer     Commissioner of Patents and Trademarks